(12) United States Patent
Lummes et al.

(10) Patent No.: US 11,326,869 B2
(45) Date of Patent: May 10, 2022

(54) SURFACE FINISH STYLUS

(71) Applicant: RENISHAW PLC, Wotton-under-Edge (GB)

(72) Inventors: Stephen Edward Lummes, Stroud (GB); Mark James Andrew Holmes, Cardiff (GB)

(73) Assignee: RENISHAW PLC, Wotton-under-Edge (GB)

( * ) Notice: Subject to any disclaimer, the term of this patent is extended or adjusted under 35 U.S.C. 154(b) by 71 days.

(21) Appl. No.: 17/041,864

(22) PCT Filed: Apr. 23, 2019

(86) PCT No.: PCT/GB2019/051130
§ 371 (c)(1),
(2) Date: Sep. 25, 2020

(87) PCT Pub. No.: WO2019/207293
PCT Pub. Date: Oct. 31, 2019

(65) Prior Publication Data
US 2021/0033379 A1 Feb. 4, 2021

(30) Foreign Application Priority Data
Apr. 26, 2018 (GB) .................... 1806828

(51) Int. Cl.
*G01B 7/34* (2006.01)
*G01B 21/04* (2006.01)

(52) U.S. Cl.
CPC .............. *G01B 7/34* (2013.01); *G01B 21/04* (2013.01)

(58) Field of Classification Search
CPC ....................................................... G01B 7/34
USPC ................................................... 33/533, 556
See application file for complete search history.

(56) References Cited

U.S. PATENT DOCUMENTS

| | | |
|---|---|---|
| 4,364,178 A | 12/1982 | Huet |
| 4,934,065 A | 6/1990 | Hajdukiewicz et al. |
| 4,941,266 A | 7/1990 | Bissegger et al. |
| 5,778,551 A | 7/1998 | Herklotz et al. |

(Continued)

FOREIGN PATENT DOCUMENTS

| | | |
|---|---|---|
| DE | 3417014 A1 | 11/1985 |
| GB | 2 070 249 A | 9/1981 |
| WO | 90/00717 A1 | 1/1990 |

OTHER PUBLICATIONS

Oct. 16, 2018 Search Report issued in British Patent Application No. GB1806828.8.

(Continued)

*Primary Examiner* — George B Bennett
(74) *Attorney, Agent, or Firm* — Oliff PLC (57) ABSTRACT

A surface finish stylus and associated methods for a multi-directional scanning probe the stylus having an elongate stylus shaft having a longitudinal axis and one or more contact elements protruding from the elongate shaft for contacting a surface to be measured. The one or more contact elements are configured to enable measurement of surface finish during motion of the stylus shaft relative to a surface along a measurement direction that is non-parallel to the longitudinal axis. The multi-directional scanning probe may be carried by a coordinate measuring machine or machine tool.

20 Claims, 4 Drawing Sheets

(56) References Cited

U.S. PATENT DOCUMENTS

| | | | | |
|---|---|---|---|---|
| 6,874,243 | B2* | 4/2005 | Hama | G01B 5/28 |
| | | | | 33/551 |
| 9,074,865 | B2* | 7/2015 | Yamauchi | G01B 21/30 |
| 9,291,442 | B2* | 3/2016 | Hidaka | G01B 21/30 |
| 9,726,481 | B2* | 8/2017 | McMurtry | G01B 7/008 |
| 2007/0125946 | A1* | 6/2007 | Boye | B82Y 15/00 |
| | | | | 250/309 |
| 2016/0097626 | A1* | 4/2016 | Miess | G01B 5/016 |
| | | | | 33/503 |
| 2016/0231108 | A1 | 8/2016 | Bucher et al. | |
| 2017/0227346 | A1 | 8/2017 | Yamauchi | |
| 2021/0025686 | A1* | 1/2021 | Lummes | G01B 1/00 |

OTHER PUBLICATIONS

Jul. 23, 2019 Search Report issued in International Patent Application No. PCT/GB2019/051130.

Jul. 23, 2019 Written Opinion of the International Searching Authority issued in International Patent Application No. PCT/GB2019/051130.

* cited by examiner

SURFACE FINISH STYLUS

The present invention relates to surface finish styli and in particular to surface finish styli for use with multi-directional, machine tool scanning probes for measuring the surface roughness or surface waviness of machined parts.

It is common to measure workpieces after they are machined to ensure they meet certain required criteria. In particular, it is known to measure the form and/or surface finish of workpieces that have been machined by a machine tool. Although the form of machined parts is routinely measured "on-machine" using a scanning probe carried in the spindle of the machine tool that was used to cut the workpiece, the surface finish (e.g. surface roughness) of such parts is typically measured "off-machine" using a dedicated profilometer.

A typical profilometer includes an elongate shaft having a workpiece-contacting tip that extends perpendicularly from the distal end of the shaft. The tip is placed in contact with the surface to be measured and then pushed or pulled along that surface thereby following any fine features (e.g. valleys and peaks) of the surface. A sensor monitors vertical deflection of the tip as it is moved across the horizontal surface thereby providing a measure of surface roughness. It should be noted that profilometers are unidirectional devices because they are arranged to only measure the vertical component of stylus tip deflection (i.e. deflection of the tip in the direction perpendicular to the surface along which the tip is moved). The relative motion between the object being measured and the tip must therefore be carefully controlled in a profilometer to ensure the tip is always kept perpendicular to the surface during the measurement procedure. The needs for a separate profilometer, in addition to the machine tool used to make the part, also adds expense and time to the production process.

A coordinate measuring machine (CMM) having a multi-directional probe traditionally used to measure the form of objects is described in U.S. Pat. No. 5,778,551. It is also described in U.S. Pat. No. 5,778,551 how a surface finish stylus may be attached to such a multi-directional probe via a rotary joint. This arrangement enables, by appropriate rotation of the surface finish stylus relative to the scanning probe using the rotary joint, the acquisition of surface finish measurements from differently oriented surfaces. U.S. Pat. No. 5,778,551 thus describes a dedicated CMM (i.e. not a machine tool) adapted to measure surface finish in a similar manner to a profilometer. Although such a CMM is more flexible than a profilometer, it is also considerably more expensive than a profilometer and does little to improve the speed of the production process.

US2016/0231108 describes an apparatus for measuring surface finish on a machine tool using a multi-directional scanning probe of the type traditionally used to acquire form measurements. In particular, a surface finish stylus is provided that comprises an elongate shaft carrying a rotationally symmetrical disk that protrudes orthogonally from the shaft. The region of largest diameter of the disk acts as a contact sensing surface and the rotational symmetry of the disk allows the surface finish of any surface aligned parallel to the longitudinal axis of the elongate shaft to be measured when the shaft is moved relative to that surface along its longitudinal axis. In this manner, the surface finish of different regions on the internal surface of a bore can be measured without having to re-orientate the scanning probe. The apparatus of US2016/0231108 may be suitable for a limited number of "on-machine" surface finish measurements (e.g. measurements of the internal surfaces of a bore), but there still remain many different surface orientations on a typical machined part that simply can't be measured using such apparatus.

According to a first aspect of the present invention, there is provided a surface finish stylus for a multi-directional scanning probe, comprising;

an elongate stylus shaft having a longitudinal axis, and one or more contact elements protruding from the elongate shaft for contacting a surface to be measured, characterised in that the one or more contact elements are configured to enable measurement of surface finish during motion of the stylus shaft relative to a surface along a measurement direction that is non-parallel to the longitudinal axis.

The present invention thus relates to a surface finish stylus for a multi-directional scanning probe. As explained below, a multi-directional probe can measure the deflection of an attached stylus in multiple directions rather than the single direction of deflection that can be sensed by the unidirectional measurement sensor of a prior art profilometer. The stylus of the present invention also has an elongate stylus shaft having a longitudinal axis with one or more contact elements protruding from the elongate shaft. Each contact element is arranged for contacting a surface to be measured and enables surface finish (e.g. surface roughness and/or surface waviness etc) to be measured as it is moved along the surface. In particular, the contact element follows the surface along which it is moved and motion of the contact element in the direction perpendicular to the surface can then be measured by a multi-directional probe to which the stylus shaft is attached.

In the prior art surface finish measurement apparatus described above, the stylus shaft is positioned so that the spike or disk that protrudes perpendicularly from the shaft contacts the surface to be measured. To collect surface finish measurements, the stylus is positioned relative to the surface so that the protruding spike or disk is aligned with the surface normal. The stylus shaft is then moved parallel to the plane of the surface to maintain alignment of the spike or disk with the surface normal whilst it is dragged over the surface. Deflection of the spike or disk in the surface normal direction is measured to establish how the surface varies along the surface. Prior art surface finish measurements are thus collected whilst the stylus shaft is moved relative to the surface along a direction that is parallel to the longitudinal axis of the stylus shaft. This restriction on relative orientation and motion means that the measurement device and/or object need to be re-orientated to measure surfaces of an object in different planes (e.g. horizontal and vertical surfaces) which is time consuming or even not possible when using certain models of machine tool.

The present invention is characterised by including one or more contact elements that are configured to enable measurement of surface finish during motion of the stylus shaft relative to a surface along a measurement direction that is non-parallel to the longitudinal axis. In other words, the one or more contact elements allow measurement of surface finish unhindered by the constraint of prior art systems of having to ensure the stylus shaft is moved relative to a surface along a direction that is parallel to the longitudinal axis of the stylus shaft. As described in more detail below, the one or more contact elements of the stylus of the present invention may protrude from the shaft at an oblique angle to the longitudinal axis or a plurality of contact elements may be provided that protrude from the shaft in a plurality of different directions and/or have different orientations. This contact element configuration enables the stylus to be moved to sense the surface finish of multiple surfaces of an object having different orientations (e.g. horizontal and vertical surfaces) without having to re-orientate the probe relative to the object.

Advantageously, the one or more contact elements are orientated at an oblique angle to the longitudinal axis. The one or more contact elements thus preferably do not extend perpendicularly from the shaft as per prior art styli, but instead protrude at a non-perpendicular or oblique angle to the stylus shaft. The stylus shaft can thus be tilted relative to a surface and moved in a direction that is non-parallel to its longitudinal axis to maintain alignment of a contact element with the surface normal of a surface as it is moved along that surface. If a plurality of contact elements are provided, these may extend from the shaft at angles which allow different orientation surfaces to be measured without having to re-orientate the probe relative to the object.

In a preferred embodiment, the one or more contact elements comprise a hollow conical element. The conical element may have a peripheral edge that protrudes from the elongate stylus shaft at an oblique angle to the longitudinal axis. The peripheral edge preferably forms a base of the cone and the apex of the cone may be coincident with the longitudinal axis of the stylus shaft. The peripheral edge is preferably arranged to contact the surface to be measured; for example, the peripheral edge of the hollow cone may be rounded and have a suitable effective radius for the surface finish measurement. The conical element may comprise a complete hollow cone (i.e. with a peripheral edge around the full 360° of the circumference) or a partial hollow cone (i.e. with a peripheral edge around only part of the stylus shaft circumference). In use, the peripherical edge is brought into contact with the surface of an object with the stylus suitably orientated so that the direction along which the conical element extends from the stylus shaft is locally aligned with the surface normal. The stylus can then be translated to move the conical element along the surface whilst maintaining local alignment with the surface normal. Surface finish information can be determined from motion of the contact element in the direction perpendicular to the surface.

Advantageously, the oblique angle is approximately 45°. The peripheral edge of the conical element may thus protrude from the stylus shaft at an oblique angle of 45°. Such a stylus orientated at 45° to the vertical can be used to measure the surface roughness of both a horizontal and a vertical surface; i.e. diametrically opposed portions of the peripheral edge can be aligned to the surface normal directions of both vertical and horizontal surfaces. The stylus can then be moved (pushed or pulled) along vertical and horizontal surfaces of an object by translational motion alone (i.e. there is no need to re-orientate the object relative to the stylus).

Advantageously, the one or more contact elements comprise a plurality of contact elements. The plurality of contact elements preferably have a plurality of different orientations relative to the stylus shaft. In other words, multiple contact elements may protrude from the shaft in different directions and/or be aligned at different angles to the shaft. For example, one contact element may protrude from the distal end of the stylus shaft along the longitudinal axis and other contact elements may protrude from the side of the shaft. The surface finish of surfaces at different orientations relative to the stylus shaft may then be measured using different contact elements. For example, if the stylus was held vertically a horizontal surface may be measured using a contact element protrude from the distal end of the stylus shaft whilst vertical surfaces may be measured using the other contact elements.

The one or more contact elements may be integrally formed with the stylus shaft. Alternatively, the one or more contact elements may be attached (permanently or releasably) to the stylus shaft. In a preferred embodiment, the stylus shaft comprises one or more clamps for retaining the one or more contact elements. In this manner, the one or more contact elements may be clamped to stylus shaft.

Advantageously, the one or more contact elements comprise a metallic disk. The metallic disk may be shaped. This shaping of the disk may be done by bending the metallic disk. The metallic disk may be shaped to provide the desired arrangement of contact elements (e.g. it may be bent to provide the one or more contact elements or to form a hollow cone). The shaping/bending of the disk may also be used to help clamp the disk in a fixed location relative to the stylus shaft. The metallic disk may comprise regions of weakness (e.g. thinner regions) that promote bending to the desired shape. Any such bending of a metallic disk may be achieved as it is clamped to the stylus shaft (e.g. using the clamps described above). The metallic disk may also comprise a plurality of slits formed therein that enable a plurality of regions of the disk to be bent to form contact elements that protrude from the plane of the metallic disk. A single piece of material (e.g. a single metallic disk) may then provide a plurality of contact elements. Alternatively, a plurality of separate contact elements may be attached to the stylus shaft.

The one or more contact elements may be formed from any suitable material. For example, a ceramic or glass material may be used. Alternatively, the one or more contact elements may be formed from a metal.

The material forming the one or more contact elements preferably has a low stiffness (to minimise damage to the surface being measured). Advantageously, the Young's modulus (E) of the one or more contact elements is less than 250 GPa. More preferably, the Young's modulus of the one or more contact elements is less than 150 GPa. More preferably, the Young's modulus of the one or more contact elements is less than 100 GPa. More preferably, the Young's modulus of the one or more contact elements is less than 50 GPa.

Advantageously, the material is also mechanically hard (i.e. to reduce wear). The material forming the one or more contact elements thus preferably has a high hardness.

Advantageously, the hardness (H) of the one or more contact elements is greater than 1 GPa. Conveniently, the hardness (H) of the one or more contact elements is greater than 2 GPa. Preferably, the hardness (H) of the one or more contact elements is greater than 5 GPa.

The Young's modulus (E) and hardness (H) properties of the one or more contact elements are each important in their own right, but it is also possible to use the ratio of stiffness to hardness (the "E/H" ratio) when selecting a suitable material for the contact elements. In particular, it is preferred that the E/H ratio is as low as possible. For example, the E/H ratio is preferably less than 50. More preferably, the E/H ratio is less than 20. More preferably, the E/H ratio is 15 or less. More preferably, the E/H ratio is less than 10.

The one or more contact elements may comprise any suitable material (e.g. having the properties outlined above). The contact element may be formed from multiple materials. Advantageously, the contact element comprises a single material. Conveniently, the contact element(s) comprise metal; for example, a metallic disk or metallic sheet of material may form the contact element. The contact element may comprise steel. For example, the contact element may comprise a chromium steel such as the martensitic chromium steel "Chromflex" as produced by Sandvik AB, Stockholm, Sweden. Chromflex has a Young's modulus (E) of 210 GPa and hardness (H) of 5.8 GPa (so E/H=36). Alternatively, the contact element may comprise zirconia (E=200 GPa, H=11.8 GPa and E/H=17). Alternatively, the contact element may comprise steatite (E=120 GPa, H=5.8 GPa and E/H=21). Alternatively, the contact element may comprise N-BK7 borosilicate glass (E=82 GPa, H=5.6 GPa and E/H=15). Advantageously, the contact element may comprise nitinol (E=45 GPa, H=5.5 GPa and E/H=8).

The one or more contact elements may be configured to measure any aspect of surface finish. It should be noted that the term surface finish refers to finer details of the surface than the form of the surface that is measured by standard scanning probes. The one or more contact elements may be configured to measure surface waviness. The one or more contact elements may be configured to measure surface roughness. Surface waviness and surface roughness are examples of surface finish.

The one or more contact elements are preferably dimensioned to measure the required aspect of surface finish. For example, the distal end (or tip) of the one or more contact elements may have an effective radius of less than 300 μm. The effective radius is the radius or dimension of the contact element in the direction parallel to the direction the contact element is moved over the surface (e.g. the thickness of the edge of a contact element disk). Advantageously, the one or more contact elements may have an effective radius of less than 200 μm. Advantageously, the one or more contact elements have an effective radius of less than 100 μm. Advantageously, the one or more contact elements have an effective radius of less than 50 μm. The smaller the object-contacting end or tip of the contact element, the finer the resolution of surface texture that can be measured (but the more susceptible the contact element is to wear or damage during use). For surface roughness, the measured variation in surface texture may be used to generate an "Ra" surface roughness value.

The stylus is preferably non-skidded (i.e. it preferably does not comprise a skid and only the contact element engages the surface being measured). The stylus shaft is preferably directly attachable to the stylus holder of a scanning probe. The stylus shaft is also preferably rigid. Advantageously, the stylus shaft does not include any rotary (knuckle) joints or the like for altering the orientation of the contact elements relative to the stylus holder of the scanning probe to which it is attached. In this manner, the location and orientation of the contact elements is invariable relative to the stylus holder of the scanning probe to which it is attached.

The present invention also extends to a multidirectional scanning probe that includes the above described surface finish stylus. The multi-directional scanning probe may then be used for acquiring surface finish measurements. The multi-directional scanning probe preferably comprises a probe body and a stylus holder moveably attached to the probe body. The stylus may be deflectable relative to the housing of the scanning probe in any one of two mutually perpendicular directions or in any of three mutually perpendicular directions. At least one deflection sensor may be provided for measuring deflection of the stylus holder relative to the probe body. A surface finish stylus as described above may be attached to the stylus holder (e.g. via a standard screw-thread attachment). In a preferred embodiment, the scanning probe comprises a machine tool scanning probe (i.e. a scanning probe suitable for use in a machine tool environment).

As mentioned above, at least one deflection sensor may be provided within the scanning probe for measuring the stylus deflection and to thereby generate probe data that can be output by the scanning probe. The scanning probe may include a deflection sensor that can only measure the magnitude (not direction) of stylus deflection; i.e. the scanning probe may comprise a multidirectional, single output scanning probe that generates probe data describing only the magnitude of stylus deflection. For example, the scanning probe may comprise a TC76-Digilog or a TC64-Digilog scanning probe as manufactured by Blum Novotest GmbH, Germany or a model G25 probe sold by Marposs, Italy. Alternatively, the scanning probe may comprise sensors that can measure both the magnitude and direction of any stylus deflection. For example, the analogue scanning probe may generate three output signals that relate to the deflection of the stylus tip in three mutually orthogonal directions. The SPRINT (OSP-60) probing system manufactured by Renishaw plc, Wotton-Under-Edge, UK is an example of such a scanning probe.

According to a second aspect of the present invention, there is provided a method for measuring the surface finish of an object using a multi-directional scanning probe comprising a surface finish stylus, the surface finish stylus comprising an elongate stylus shaft having a longitudinal axis and one or more contact elements protruding from the elongate shaft for contacting a surface to be measured, the method being characterised by the step of measuring surface finish by moving the stylus shaft relative to a surface along a measurement direction that is non-parallel to the longitudinal axis.

Advantageously, the step of measuring surface finish comprises orientating the surface finish stylus relative to the surface so as to maintain alignment of the contact element with the local surface normal whilst the stylus shaft is moved relative to the surface along the measurement direction. In this manner, stylus deflections along the surface normal direction are measured. The method may also include any of the features, or ways to use, the stylus that are described above.

According to a further aspect of the present invention, there is provided a surface finish stylus for a multi-directional scanning probe that comprises an elongate shaft having a longitudinal axis and a plurality of contact elements extending from the elongate shaft. The plurality of contact elements preferably have a plurality of different orientations relative to the stylus shaft. Advantageously, the plurality of contact elements comprise a first contact element protruding from the distal end of the elongate shaft along the longitudinal axis. Preferably, the plurality of contact elements comprise at least one contact element protruding radially or obliquely from the elongate shaft. Further contact elements may be provided as required. The stylus may also include any of the features of the styli described above.

According to a further aspect of the present invention, there is provided a surface finish stylus for a multi-directional scanning probe, comprising an elongate shaft having a longitudinal axis and one or more contact elements extending from the elongate shaft at an oblique angle relative to the longitudinal axis. The one or more contact elements comprise a hollow conical element. The conical element may protrude at an oblique angle of 45° to the longitudinal axis. The stylus may also include any of the features of the styli described above.

The skilled person would appreciate that any of the above described features may be combined with any one or more features of the specific embodiments that are described below. Similarly, features described in the context of a method may form part of the apparatus and vice versa.

The invention will now be described, by way of example only, with reference to the accompanying drawings in which.

Figure 1:
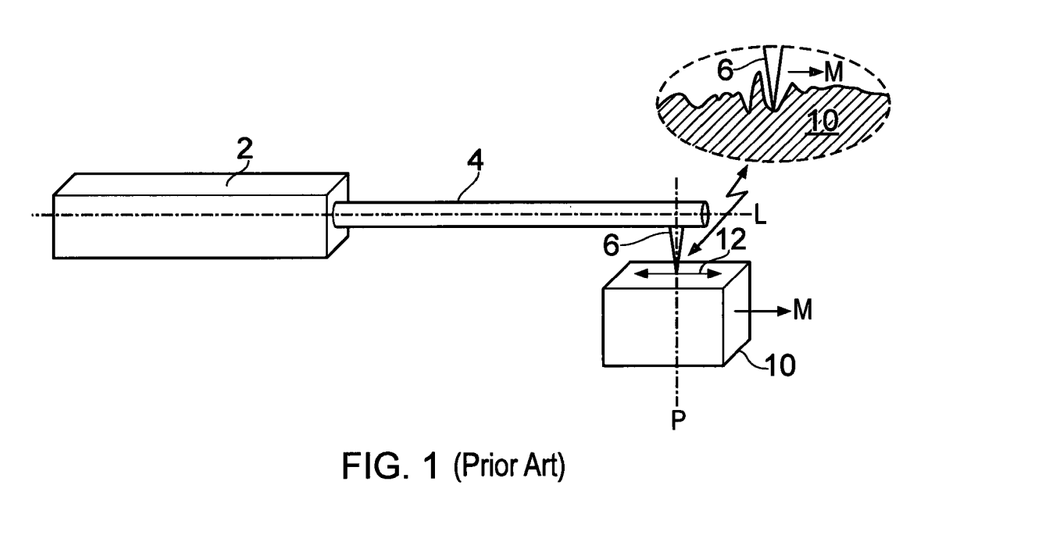
FIG. 1 illustrates a prior art profilometer apparatus.

Referring to FIG. 1, a prior art profilometer is schematically illustrated. The profilometer comprises a housing 2 from which extends an elongate shaft 4 having a longitudinal axis L. A contact element 6 extends perpendicularly from the shaft 4 along the direction P. The housing 2 includes a unidirectional transducer (not shown) that measures any deflection of the shaft 4 caused by motion of the contact element 6 back and forth along the direction P.

In use, the contact element 6 is brought into contact with the surface of an object 10. The contact element 6 is then moved relative to the object 10 in a direction M that is parallel to the longitudinal axis L. This relative motion between the object 10 and profilometer may be imparted by moving the profilometer (e.g. by linearly retracting/extending the shaft 4), the object 10, or both the object and the profilometer. The result of the relative motion is to cause the contact element 6 to move (i.e. to be pushed or pulled) along a path 12 on the surface of the object 10. The contact element 6 also moves up and down to follow the surface; this can be seen in the inset to FIG. 1 that provides an expanded view of the tip of the contact element 6 and the object's surface. The unidirectional transducer within the housing 2 outputs a deflection signal that is related to the vertical deflection of the contact element 6 (i.e. deflection along the direction P). Analysis of the variations in the deflection signal as the path 12 is traversed provides a measure of surface finish of that region of the object. For example, an average surface roughness or $R_a$ value may be calculated.

Figure 2:
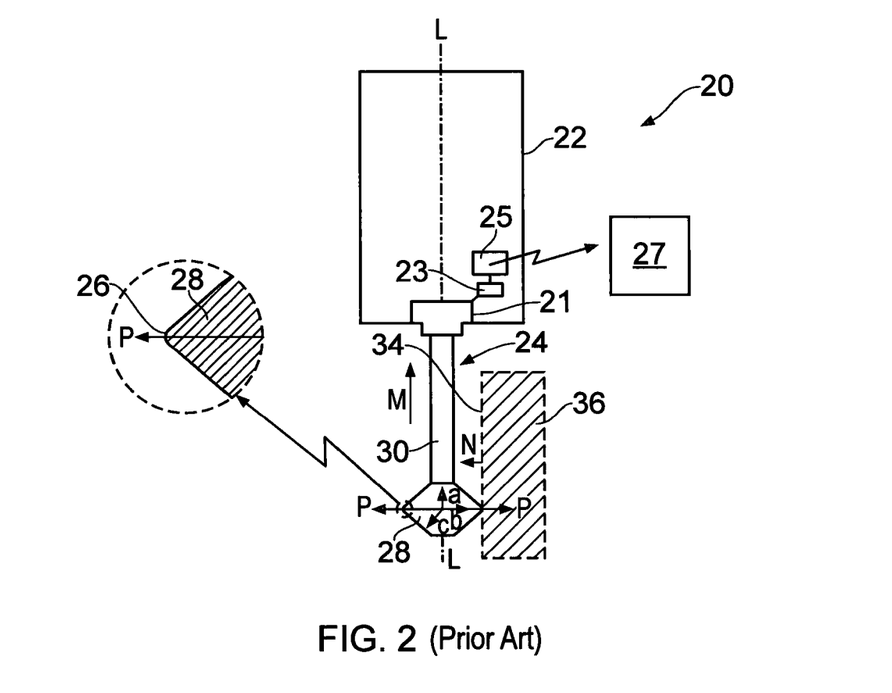
FIG. 2 illustrates a prior art surface roughness machine tool scanning probe.

Referring to FIG. 2, the prior art surface roughness probe 20 of US2016/0231108 will be described in more detail. As mentioned above, the scanning probe of US2016/0231108 is a multi-directional scanning probe that can be mounted to the spindle of a machine tool to allow "on-machine" measurement of workpieces.

The scanning probe 20 comprises a probe body 22 and a stylus holder 21 for retaining a stylus. The stylus holder 21 is attached to the probe body 22 by a deflection mechanism (not shown) and a transducer 23 is also provided within the probe body 22 for measuring the magnitude of deflection of the stylus holder 21 (i.e. caused by deflection of an attached stylus) relative to the probe body 22. Deflection measurements taken by the transducer 23 are passed by a transmitter unit 25 to a probe interface 27. The probe body 22 is also attachable to the spindle of a machine tool via a tool shank (not shown). The probe 20 can thus be moved around the working volume of the machine tool and in particular the probe stylus can be brought into contact with the surface of an object to be measured.

A scanning probe 20 of this type is traditionally used with a stylus that enables the form of an object to be measured; e.g. such a stylus may comprise a ruby sphere of several millimetres diameter that is attached to the distal end of an elongate shaft. In the various examples described in US2016/0231108, a surface roughness stylus 24 is instead attached to the probe 20. The surface roughness stylus 24 comprises an elongate shaft 30 and a contact element 28 that extends perpendicularly P from the longitudinal axis L of the shaft 30. The contact element 28 has the form of a double-truncated cone with a rounded peripheral edge 26 (shown in the inset to FIG. 2) around its circumference.

In use, the perpendicular direction P along which the contact element 28 protrudes from the shaft 30 is aligned to be parallel with the surface normal N of a surface to be measured. FIG. 2 shows a suitable vertical surface 34 of an object 36 in dashed outline. The peripheral edge 26 of the contact element 28 is brought into contact with the vertical surface 34 and the probe 20 is then moved vertically upwards in the direction M. To maintain the required alignment of the perpendicular protrusion direction P of the contact element 28 with the surface normal N, the probe 20 is moved vertically along a direction M that is both parallel to longitudinal axis L of the stylus shaft 30 and also parallel to the plane of the surface 34. The transducer 23 of the scanning probe 20 measures the magnitude of stylus deflection as it is dragged along the surface 34 and these measured deflection values are used to ascertain surface roughness.

The present inventors have recognised a number of drawbacks associated with the arrangement described in US2016/0231108. For example, the scanning probe 20 must be moved in a direction M parallel to the longitudinal axis L of the stylus shaft 30 and also parallel to the plane of the surface (e.g. surface 34). These constraints are necessary to ensure the surface normal N of the surface being measured remains parallel to the perpendicular direction P along which the contact element 28 protrudes from the shaft 30 whilst the path is traversed. For example, surface roughness may be measured at any circumferential position within a vertical bore by moving the probe vertically up or down. It is, however, not possible to measure surfaces in a plane angled relative to the longitudinal axis L of the stylus shaft (e.g. horizontal surfaces such as the bottom surface of a blind bore) without having to somehow re-orientate the scanning probe or the object. For example, the scanning probe 20 would have to be re-orientated by 90° relative to an object to measure both a vertical surface and a horizontal surface. Such re-orientation is simply not possible on certain models of machine tool and, even if it is possible, can lead to delays in the measurement process thereby increasing production costs.

Various drawbacks of the arrangement of US2016/0231108 have been overcome by the styli arrangement described below. For example, the styli described below allow the measurement of the surface roughness along surfaces orientated in a plane that is not parallel to the longitudinal axis of the shaft from which the contact elements used to measure surface finish protrude. Styli are also described that allow the measurement of differently orientated surfaces without having to re-orientate the probe or stylus relative to the object.

Figures 3A, 3B:
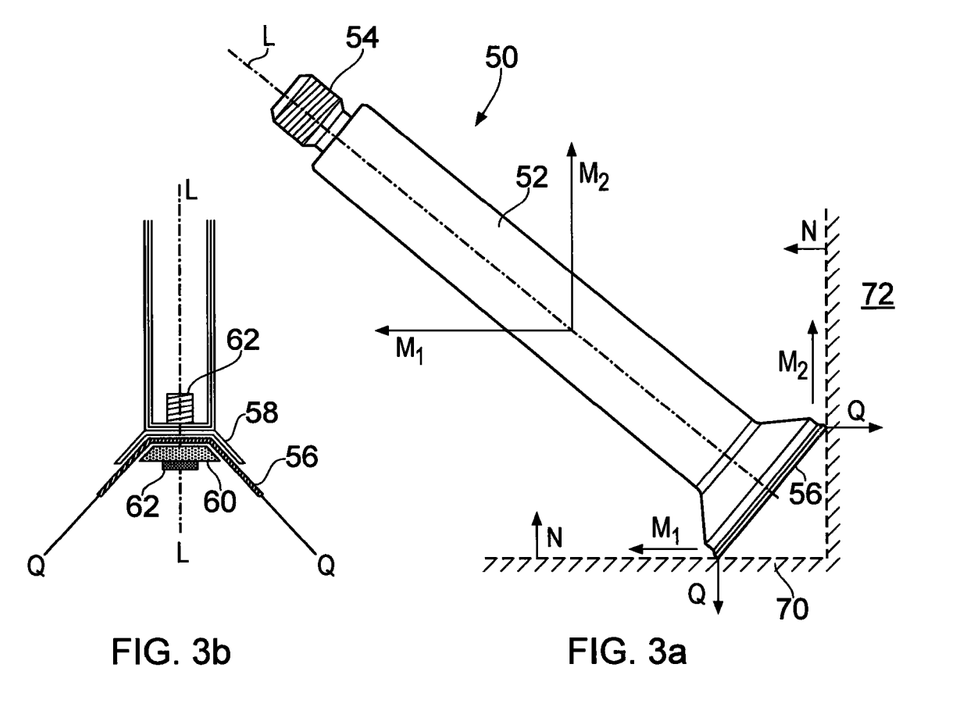
FIGS. 3a and 3b illustrates a surface finish stylus of the present invention.

FIGS. 3a and 3b illustrate a surface finish stylus 50 of the present invention. The stylus 50 comprises an elongate stylus shaft 52 having a longitudinal axis L. The proximal end of the stylus shaft 52 includes a screw-thread attachment member 54 that enables the stylus to be attached to the stylus holder of a multi-directional scanning probe (not shown). The distal end of the stylus shaft 52 comprises a contact element in the form of a hollow, conically shaped metallic disk 56. The metallic disk 56 is held in a truncated conical recess 58 by a wedge-shaped retaining member 60 that is attached to the stylus shaft by a bolt 62. The metallic disk 56 is thus a skirt-like contact element that extends around the circumference of the stylus shaft 52 and protrudes along a direction Q that is angled at 45° relative to the longitudinal axis L.

In use, the surface finish stylus 50 can be used to measure the surface finish of multiple surfaces having different orientations without having to re-orientate the scanning probe. For example, as shown in FIG. 3a, the surface finish stylus 50 is inclined at an angle of 45° to the horizontal (and vertical). The surface finish stylus 50 may then be moved in the direction M1 in order to measure the surface finish of a horizontal surface 70; i.e. the contact element 56 is pulled along the horizontal surface 70 by horizontal motion M1 whilst the scanning probe retaining the stylus 50 measures stylus deflection. The surface finish stylus 50 may then be moved in the direction M2 in order to measure the surface finish of a vertical surface 72; i.e. a diametrically opposed part of the contact element 56 is pulled along the vertical surface 72 by vertical motion M2 whilst the scanning probe retaining the stylus 50 again measures stylus deflection. For both the horizontal and vertical measurements, the protruding contact element 56 maintains a perpendicular orientation to the surface normal N (i.e. the direction Q along which the contact element protrudes from the elongate shaft is kept aligned to the local surface normal N as the stylus is moved along directions M1 and M2).

Unlike the prior art arrangement described with reference to FIG. 2, the surface finish stylus 50 is not constrained by the limitation that the direction of stylus motion must be along the longitudinal axis of the stylus shaft. This enables surfaces having different orientations to be measured without having to re-orientate the scanning probe relative to the object thereby increasing measurement flexibility and reducing measurement time.

Figure 4A:
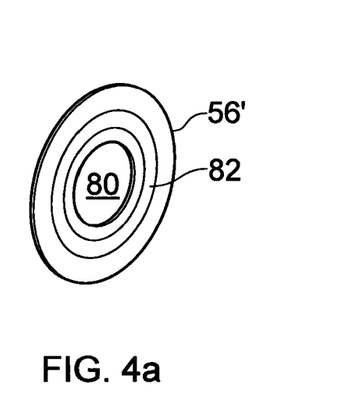
FIGS. 4a and 4b show in more detail the conical insert disk of the stylus described with reference to FIG. 3.
Figure 4B:
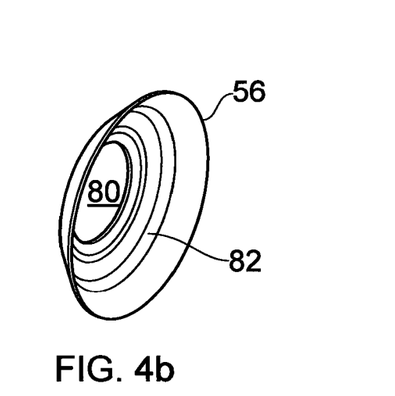

Referring briefly to FIGS. 4a and 4b, a technique for making the surface finish stylus 50 described with reference to FIGS. 3a and 3b will be described. In particular, the method for forming the metallic disk 56 that provides the contact element of the stylus will be described.

As shown in FIG. 4a, a flat metallic disk 56' is provided. The disk 56' includes a central aperture 80 and an annular region 82 of material that is thinner than the rest of the disk. Referring also now to FIG. 3b, the wedge-shaped retaining member 60 is located on the bolt 62 to engage the flat metallic disk 56' already placed over the threaded bolt; the diameter of the central aperture 80 being slightly larger than the diameter of the bolt thread to provide clearance. The bolt 62 is then screwed into the stylus shaft thereby forcing the flat metallic disk 56' into engagement with the truncated conical recess 58. The flat metallic disk 56' is thus sandwiched between the wedge-shaped retaining member 60 and the truncated conical recess 58 and tightening the bolt 62 acts to deform the flat metallic disk 56' to provide the conically shaped metallic disk 56 shown in FIG. 4b and in FIG. 3b. This ensures the metallic disk 56 is securely attached to the stylus shaft and also enables the metallic disk 56 to be easily replaced (e.g. if it becomes worn or damaged) without having to replace the entire surface finish stylus. It should be noted that although this method of forming the hollow cone contact element is advantageous, other fabrication techniques could be used.

Figures 5, 6:
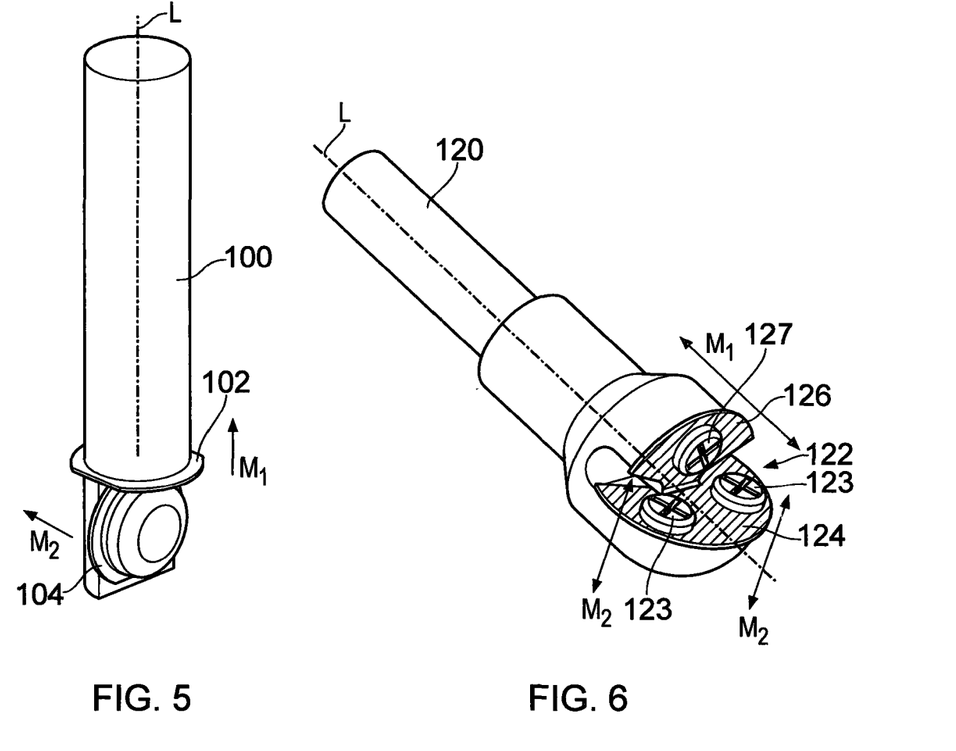
FIG. 5 illustrates an alternative surface finish stylus comprising two contact element disks.
FIG. 6 shows an alternative embodiment of a surface finish stylus comprising multiple contact elements.

FIG. 5 shows an alternative embodiment of surface finish stylus. An elongate stylus shaft 100 having a longitudinal axis L retains a first contact element 102 and a second contact element 104. The first contact element 102 is a disk that extends perpendicularly from the stylus shaft 100 that can sense surface roughness of surfaces aligned with the longitudinal axis L when moved in the direction M1. The second contact element 104 is also a disk, but is located below and orientated perpendicularly to the first contact element 102. The second contact element 104 is located to lie on the longitudinal axis and can measure surface roughness when moved relative to a surface along the direction M2. The direction M2 is perpendicular to the direction M1.

FIG. 6 shows an alternative embodiment of surface finish stylus. An elongate stylus shaft 120 having a longitudinal axis L is again provided. A slotted metallic disk 122 is attached to the distal end of the shaft 120. A first segment 124 of the metallic disk is attached by two screws 123 to a flat support surface that lies in a plane parallel to the longitudinal axis L. The first segment 124 provides a contact element that can be used to measure the surface roughness of vertical or horizontal surfaces by movement along the direction M2. A second segment 126 of the disk is bent to extend perpendicularly from the longitudinal axis L and held by a screw 127 against a flat support surface that is perpendicular to the longitudinal axis L. The second segment 126 forms a contact element for measuring roughness of surfaces aligned with the longitudinal axis L when moved in the direction M1.

Figure 7:
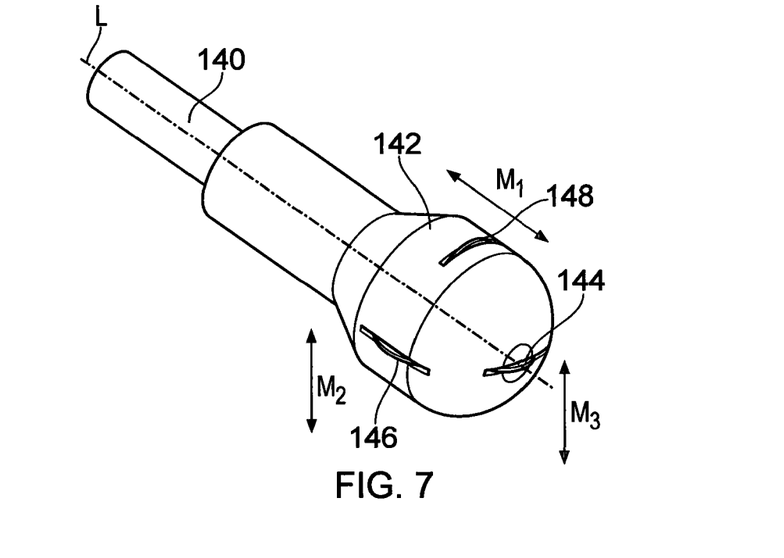
FIG. 7 shows an alternative embodiment of a surface finish stylus comprising three orthogonally orientated contact elements.

FIG. 7 shows an alternative embodiment of surface finish stylus. An elongate stylus shaft 140 having a longitudinal axis L comprises an ovoid shell 142 at its distal end. A first contact element 144, a second contact element 146 and a third contact element 148 protrude through apertures in the shell 142. The first contact element 144 protrudes from the bottom of the shell 142 along the longitudinal axis. The first contact element 144 can thus be used to measure surface roughness of surfaces perpendicular to the stylus. For example, if the longitudinal axis L is aligned to the vertical the first contact element 144 can be moved along a horizontal surface in the direction M3. The second contact element 146 extends from the shaft and is orientated to measure surface roughness in the direction M2. For example, if the longitudinal axis L is aligned to the vertical the second contact element 146 can measure surface roughness along a horizontal contour on a vertical surface. The third contact element 148 forms a contact element for measuring roughness of surfaces aligned with the longitudinal axis L when moved in the direction M1. As a variation to the embodiment shown in FIG. 7, it would be possible to provide a surface finish stylus with additional contact elements or an alternative arrangement of contact elements. For example, pairs of contact elements could be provided on opposite sides of the ovoid shell 142.

Figure 8A:
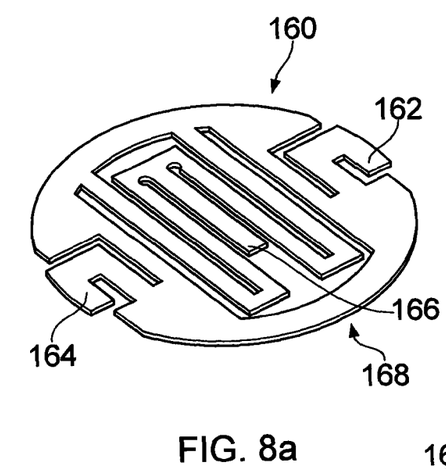
FIGS. 8a and 8b illustrates folding a metallic disk to form contact elements in multiple orientations.
Figure 8B:
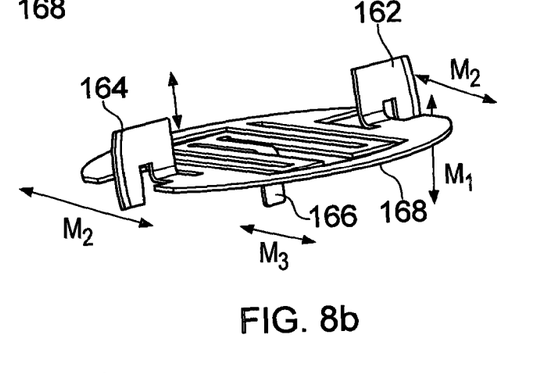

Referring next to FIGS. 8a and 8b, it will be described how a foldable metallic sheet may be used to form a surface finish stylus that can provide a plurality of contact elements that allow surface finish to be measured along a plurality of different directions. FIG. 8a shows a metallic sheet cut to form a disk 160 which includes cut-outs that allow selected sections of the disk to be folded. FIG. 8*b* shows how the regions 162 and 164 can be folded upwards to provide contact elements for sensing surface finish in the direction M2. The region 166 can be folded downwards to form a contact element for sensing surface finish in the direction M3. The edge region 168 can provide (without being folded) a contact element for measuring roughness of surfaces aligned with the longitudinal axis L when moved in the direction M1. The folder disk of FIG. 8*b* may be housed in a shell so that the contact elements protrude through the shell, in a similar manner to that shown in FIG. 7.

Figure 9:
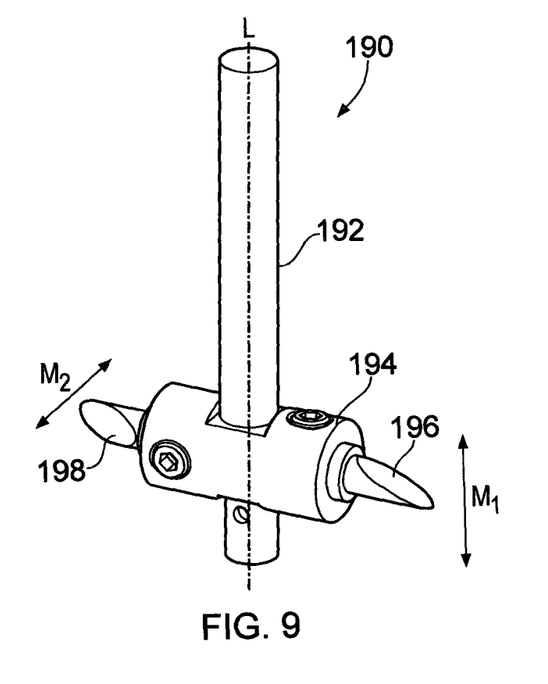
FIG. 9 shows a further embodiment of the surface finish stylus that comprises multiple contact elements.

FIG. 9 illustrates a further surface finish stylus 190 having a elongate stylus shaft 192 with a longitudinal axis L. A carrier 194 attached to the shaft 192 holds a first contact element 196 and a second contact element 198. The illustrated contact elements 196 and 198 are single bevel edge surface finish styli, as sold by the Mitutoyo Corporation, Kanagawa, Japan. The first contact element 196 is orientated to measure surface finish when the stylus is moved in the direction M1 that is parallel to the longitudinal axis L; e.g. to measure surface finish up or down a vertical surface. The second contact element 198 is orientated to measure surface finish when the stylus is moved in the direction M2; e.g. to measure surface finish along a horizontal contour of a vertical surface.

The skilled person would recognise that the above are merely examples of the invention. Alternative stylus structures could be provided in accordance with the present invention.

The invention claimed is:

1. A surface finish stylus for a multi-directional scanning probe, comprising;
an elongate stylus shaft having a longitudinal axis, and one or more contact elements protruding from the elongate shaft for contacting a surface to be measured,
wherein the one or more contact elements are configured to enable measurement of surface finish during motion of the stylus shaft relative to a surface along a measurement direction that is non-parallel to the longitudinal axis.

2. The stylus according to claim 1, wherein the one or more contact elements are orientated at an oblique angle to the longitudinal axis.

3. The stylus according to claim 1, wherein the one or more contact elements comprise a hollow conical element having a peripheral edge that protrudes from the elongate stylus shaft at an oblique angle to the longitudinal axis, the peripheral edge being for contacting the surface to be measured.

4. The stylus according to claim 2, wherein the oblique angle is approximately 45°.

5. The stylus according to claim 1, wherein the one or more contact elements comprise a plurality of contact elements having a plurality of different orientations relative to the stylus shaft.

6. The stylus according to claim 1, wherein the stylus shaft comprises one or more clamps for retaining the one or more contact elements.

7. The stylus according to claim 1, wherein the one or more contact elements comprise a metallic disk.

8. The stylus according to claim 7, wherein the metallic disk is bent.

9. The stylus according to claim 7, wherein the metallic disk comprises a plurality of slits formed therein that enable a plurality of regions of the disk to be bent to form contact elements that protrude from the plane of the metallic disk.

10. The stylus according to claim 1, wherein the one or more contact elements are formed from low stiffness material.

11. The stylus according to claim 1, wherein the effective radius of the one or more contact elements is less than 300 µm.

12. A multi-directional scanning probe for acquiring surface finish measurements, comprising; a probe body, a stylus holder moveably attached to the probe body, and a deflection sensor for measuring deflection of the stylus holder relative to the probe body, wherein a surface finish stylus according to claim 1 is attached to the stylus holder.

13. The scanning probe according to claim 12 that comprises a machine tool scanning probe.

14. A method for measuring the surface finish of an object using a multi-directional scanning probe comprising a surface finish stylus, the surface finish stylus comprising an elongate stylus shaft having a longitudinal axis and one or more contact elements protruding from the elongate shaft for contacting a surface to be measured, the method comprising the step of measuring surface finish by moving the stylus shaft relative to a surface along a measurement direction that is non-parallel to the longitudinal axis.

15. The method according to claim 14, wherein the step of measuring surface finish comprises orientating the surface finish stylus relative to the surface so as to maintain alignment of the contact element with the local surface normal whilst the stylus shaft is moved relative to the surface along the measurement direction.

16. A surface finish stylus for a multi-directional scanning probe, comprising an elongate shaft having a longitudinal axis and a plurality of contact elements extending from the elongate shaft, the plurality of contact elements having a plurality of different orientations relative to the stylus shaft.

17. The surface finish stylus according to claim 16, wherein the plurality of contact elements comprises a first contact element protruding from the distal end of the elongate shaft along the longitudinal axis.

18. A surface finish stylus for a multi-directional scanning probe, comprising an elongate shaft having a longitudinal axis and one or more contact elements extending from the elongate shaft at an oblique angle to the longitudinal axis.

19. The surface finish stylus according to claim 18, wherein the one or more contact elements comprise a hollow conical element.

20. The surface finish stylus according to claim 19, wherein the conical element protrudes at an oblique angle of 45° to the longitudinal axis.

* * * * *